United States Patent
Tang

(10) Patent No.: US 10,257,037 B2
(45) Date of Patent: Apr. 9, 2019

(54) METHOD AND DEVICE FOR IMPLEMENTING SEAMLESS SWITCHING BETWEEN NORTHBOUND CORBA INTERFACE SPECIFICATIONS

(71) Applicant: ZTE Corporation, Shenzhen (CN)

(72) Inventor: Hailong Tang, Shenzhen (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 262 days.

(21) Appl. No.: 15/100,668

(22) PCT Filed: Jun. 4, 2014

(86) PCT No.: PCT/CN2014/079174
§ 371 (c)(1),
(2) Date: Jun. 1, 2016

(87) PCT Pub. No.: WO2014/183714
PCT Pub. Date: Nov. 20, 2014

(65) Prior Publication Data
US 2016/0301568 A1  Oct. 13, 2016

(30) Foreign Application Priority Data

Dec. 2, 2013 (CN) .......................... 2013 1 0641405

(51) Int. Cl.
G06F 15/177 (2006.01)
H04L 12/24 (2006.01)

(52) U.S. Cl.
CPC ...... H04L 41/0813 (2013.01); H04L 41/0233 (2013.01); H04L 41/044 (2013.01); H04L 41/0823 (2013.01)

(58) Field of Classification Search
CPC ............. H04L 41/0233; H04L 41/0813; H04L 41/0823; H04L 41/08
(Continued)

(56) References Cited

U.S. PATENT DOCUMENTS

| 6,470,388 B1* | 10/2002 | Niemi | G06F 11/3476 |
| | | | 709/223 |
| 2002/0194391 A1* | 12/2002 | Yamamoto | G06F 9/465 |
| | | | 719/316 |
| 2013/0097616 A1* | 4/2013 | Bickle | G06F 8/447 |
| | | | 719/315 |

FOREIGN PATENT DOCUMENTS

| CN | 1728697 A | 2/2006 |
| CN | 101304331 A | 11/2008 |
| CN | 102420697 A | 4/2012 |

OTHER PUBLICATIONS

International Search Report for corresponding application PCT/CN2014/079174 filed on Jun. 4, 2014; dated Sep. 1, 2014.

* cited by examiner

*Primary Examiner* — Wing F Chan
*Assistant Examiner* — Andrew Woo
(74) *Attorney, Agent, or Firm* — Cantor Colburn LLP

(57) ABSTRACT

The disclosure discloses a method and device for implementing seamless switching between northbound Common Object Request Broker Architecture (Corba) interface specifications, which relate to northbound interfaces in telecommunication network management field. The method includes that: when a northbound component of an Element Management System (EMS) is initiated, according to configuration information of a northbound Corba specification supported by the EMS, a corresponding relationship between the northbound Corba specification and the configuration information of the northbound Corba specification supported by the EMS is established, and a specification switching file is provided to a Network Management System (NMS); according to a Corba specification switching command sent by the NMS, and according to the corresponding relationship between the northbound Corba specification (Continued)

and the configuration information of the northbound Corba specification supported by the EMS, the EMS acquires the configuration information required for the Corba specification to be switched; and the EMS executes the seamless switching between northbound Corba interface specifications by using the configuration information required for the Corba specification to be switched.

14 Claims, 4 Drawing Sheets

(58) Field of Classification Search
USPC .................................................. 709/220, 221
See application file for complete search history.

METHOD AND DEVICE FOR IMPLEMENTING SEAMLESS SWITCHING BETWEEN NORTHBOUND CORBA INTERFACE SPECIFICATIONS

TECHNICAL FIELD

The disclosure relates to northbound interfaces in telecommunication network management field, and in particular to a method and device for implementing seamless switching between northbound Common Object Request Broker Architecture (Corba) interface specifications.

BACKGROUND

In network management, two entities interacting with each other play two roles namely a manager and an agent. The manager is in charge of sending a management command and receiving a notice sent by the agent. The agent is in charge of receiving the management command sent by the manager, performing management configuration on a managed object according to the management command, and returning an operation response to the manager when an operation refers to an acknowledgement operation.

In telecommunication network management, a Network Management System (NMS) at an operator side serves as a manager, an Element Management System (EMS) serves as an agent, and network management interfaces between the NMS and EMS are northbound interfaces.

A northbound Corba interface is one of the northbound interfaces. A Corba describes an interface by means of an Interface Description Language (IDL), an operator describes a complete set of management commands to be written into IDL files, specific implementation of management operation on the interface in the IDL is completed by a telecommunication service provider, and when the NMS sends the management command to the EMS via the northbound Corba interface according to the IDL files, the EMS completes the management operation and returns an operation response.

Different operators have their own specific management commands. Thus, different telecommunication service providers define respective northbound Corba interface specifications. As requirements of the operators for unification degree of comprehensive network management are increasing, information demands of the operators for the northbound Corba interface of the EMS are increasing in terms of both type and quantity, operation instructions will synchronously change, and therefore an identical operator has multiple sets of northbound Corba interface specifications.

The northbound Corba interface specifications of different telecommunication operators or multiple sets of northbound Corba interface specifications of the identical telecommunication operator can achieve different management functions due to different management commands. Thus, whether a set of EMS can support multiple sets of northbound Corba interface specifications and can implement seamless and smooth switching between multiple sets of specifications becomes an important index to measure the adaptability and reliability of the EMS.

A main disadvantage of the current switching operation on the northbound Corba interface specifications is that it is necessary to interrupt an EMS service. The traditional specification switching operation includes the steps as follows.

Step A: If the EMS is stopped, all EMS services will be ended.

Step B: Configuration files associated with original northbound Corba specifications are replaced with configuration files of new specifications.

Step C: The EMS is restarted, relevant parameters in the configuration files of the new Corba specifications are loaded, and after starting is completed, switching between the northbound Corba specifications is completed.

It is necessary to stop and restart the complete set of EMS to switch the traditional specifications, time consumption is high, relevant telecommunication services of the operators are interrupted, and a certain influence will be brought to the operators. Moreover, the switching operation needs a cooperation of professionals for the EMS. Thus, by means of the traditional method, efficiency is low, and service continuity and usability are relatively low.

SUMMARY

The embodiments of disclosure provide a method and device for implementing seamless switching between northbound Corba interface specifications, which can be used to solve the problems that an operation efficiency and an usability are reduced and a service continuity are influenced due to a fact that an EMS needs to cooperate with a person and needs to be stopped.

In one embodiment of the disclosure, a method for implementing seamless switching between northbound Corba interface specifications is provided, which may include that:

establishing, when a northbound component of an Element Management System (EMS) is started, according to configuration information of a northbound Corba specification supported by the EMS, a corresponding relationship between the northbound Corba specification supported by the EMS and the configuration information of the northbound Corba specification supported by the EMS, and providing a specification switching file to a Network Management System (NMS); obtaining, by the EMS, according to a Corba specification switching command sent by the NMS on a basis of the specification switching file, a Corba specification to be switched; acquiring, by the EMS, according to the corresponding relationship between the northbound Corba specification supported by the EMS and the configuration information of the northbound Corba specification supported by the EMS, configuration information required for the Corba specification to be switched; and executing, by the EMS, seamless switching between northbound Corba interface specifications by using the configuration information required for the Corba specification to be switched.

In an example embodiment, establishing, according to the configuration information of the northbound Corba specification supported by the EMS, the corresponding relationship between the northbound Corba specification supported by the EMS and the configuration information of the northbound Corba specification supported by the EMS includes: traversing and checking configuration information which is pre-saved by the EMS and adaptive to the northbound Corba specification; and establishing the corresponding relationship between the northbound Corba specification and the configuration information according to the traversed and checked configuration information adaptive to the northbound Corba specification to generate a specification mapping table.

In an example embodiment, providing the specification switching file to the NMS includes: loading resources required for Corba specification switching; and generating an Interoperable Object Reference (IOR) file containing the resources required for Corba specification switching, according to the loaded resources, for the NMS to use.

In an example embodiment, sending, by the NMS, the Corba specification switching command according to the specification switching file includes: acquiring, by the NMS, an IOR file from the EMS; parsing the acquired IOR file to obtain resources required for Corba specification switching; and sending the Corba specification switching command to the EMS according to the resources required for Corba specification switching.

In an example embodiment, acquiring, according to the corresponding relationship between the northbound Corba specification supported by the EMS and the configuration information of the northbound Corba specification supported by the EMS, the configuration information required for the Corba specification to be switched includes: comparing the Corba specification to be switched with specifications in a specification mapping table; and when the Corba specification to be switched is included in the specification mapping table, parsing, according to the corresponding relationship between the northbound Corba specification supported by the EMS and the configuration information of the northbound Corba specification supported by the EMS, the specification mapping table to obtain the configuration information required for the Corba specification to be switched.

In an example embodiment, executing seamless switching between the northbound Corba interface specifications by using the configuration information required for the Corba specification to be switched includes: associating the configuration information required for the Corba specification to be switched with a Portable Object Adapter (POA) by reading the configuration information required for the Corba specification to be switched, to complete the seamless switching between the northbound Corba interface specifications.

In an example embodiment, before the configuration information required for the Corba specification to be switched is associated with the POA, the method further includes: disassociating the POA from configuration information required for an original Corba specification.

In an example embodiment, further including: when the northbound component of the EMS is started, acquiring, by the NMS, the specification switching file provided by the EMS;

parsing the specification switching file to obtain resources required for Corba specification switching; and sending a Corba specification switching command to the EMS according to the resources required for Corba specification switching.

According to another aspect of the embodiments of the disclosure, a device for implementing seamless switching between northbound Corba interface specifications is provided, which may include:

a specification loading element, configured to establish, when a northbound component of an Element Management System (EMS) is started, according to configuration information of a northbound Corba specification supported by the EMS, a corresponding relationship between the northbound Corba specification supported by the EMS and the configuration information of the northbound Corba specification supported by the EMS, and provide a specification switching file to a Network Management System (NMS); a command parsing element, configured to, according to a Corba specification switching command sent by the NMS on a basis of the specification switching file, obtain a Corba specification to be switched; a specification parsing element, configured to, according to the corresponding relationship between the northbound Corba specification and the configuration information of the northbound Corba specification supported by the EMS, acquire the configuration information required for the Corba specification to be switched; and a Portable Object Adapter (POA) association element, configured to execute seamless switching between northbound Corba interface specifications by using the configuration information required for the Corba specification to be switched.

In an example embodiment, the specification loading element includes: a file pre-processing component, configured to traverse and check configuration information which is pre-saved by the EMS and adaptive to the northbound Corba specification; and a specification mapping table component, configured to establish the corresponding relationship between the northbound Corba specification and the configuration information of the northbound Corba specification supported by the EMS according to the traversed and checked configuration information adaptive to the northbound Corba specification to generate a specification mapping table.

A computer storage medium is provided. Computer executable instructions may be stored therein and may be configured to execute the above method.

Compared with the related art, the embodiments of the disclosure have the beneficial effects as follows. By implementing a method for a specification switching interface consistent with a Corba interface on the EMS, the NMS initiates a specification switching operation, the EMS does not need to cooperate with a person and does not need to be stopped, and specification switching can be automatically performed, thereby improving the operation efficiency and the usability and ensuring the service continuity.

DETAILED DESCRIPTION OF THE EMBODIMENTS

Example embodiments of the disclosure are described below with reference to the drawings in detail. It should be understood that the example embodiments described below are only intended to describe and explain the disclosure and does not limit the disclosure.

Figure 1:
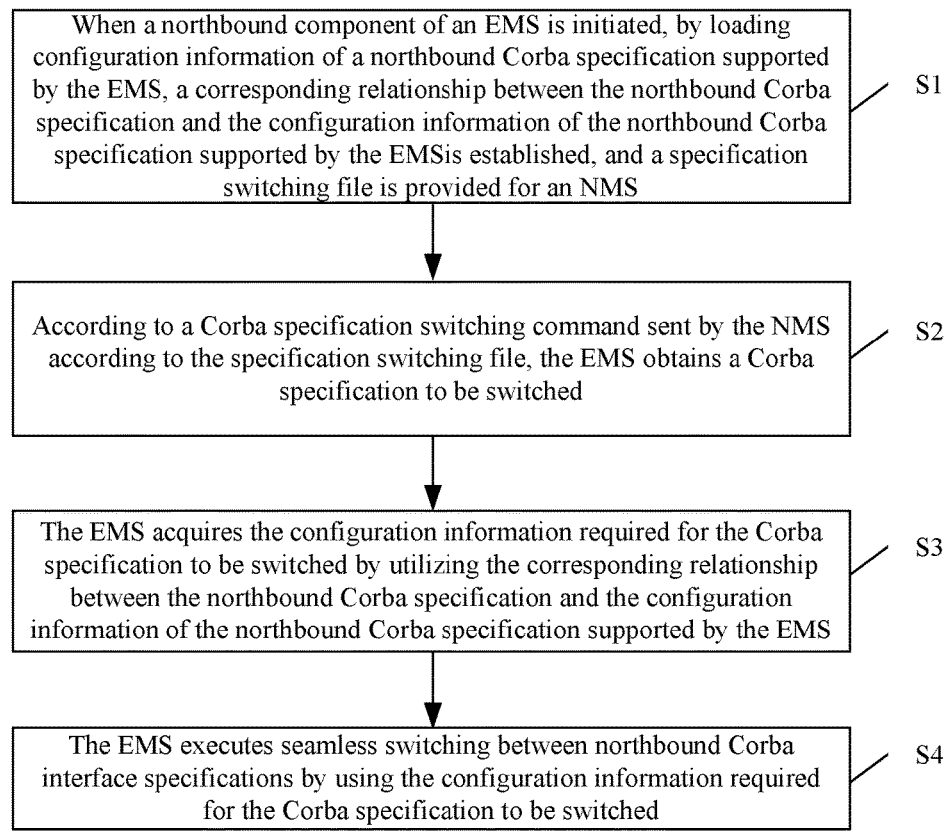
FIG. 1 is a schematic diagram of a method for implementing seamless switching between northbound Corba interface specifications according to an embodiment of the disclosure.

FIG. 1 is a schematic diagram of a method for implementing seamless switching between northbound Corba interface specifications according to an embodiment of the disclosure. As shown in FIG. 1, the method includes the specific steps as follows.

Step S1: When a northbound component of an EMS is started, according to configuration information of a northbound Corba specification supported by the EMS, a corresponding relationship between the northbound Corba specification and the configuration information of the northbound Corba specification supported by the EMS is established, and a specification switching file is provided to an NMS.

In Step S1, furthermore, configuration information which is pre-saved by the EMS and adaptive to the northbound Corba specification is traversed and checked; and the corresponding relationship between the northbound Corba specification and the configuration information of the northbound Corba specification supported by the EMS is established according to the traversed and checked configuration information adaptive to the northbound Corba specification so as to generate a specification mapping table.

Furthermore, resources required for Corba specification switching are loaded; and an IOR file containing the resources required for Corba specification switching is generated, according to the loaded resources, for the NMS to use;

wherein an IOR is an Interoperable Object Reference.

Step S2: According to a Corba specification switching command sent by the NMS on a basis of the specification switching file, the EMS obtains a Corba specification to be switched.

In Step S2, furthermore, the NMS acquires the IOR file from the EMS;

the acquired IOR file is parsed to obtain the resources required for Corba specification switching; and the Corba specification switching command is sent to the EMS according to the resources required for Corba specification switching.

Step S3: According to the corresponding relationship between the northbound Corba specification and the configuration information of the northbound Corba specification supported by the EMS, the EMS acquires the configuration information required for the Corba specification to be switched.

In Step S3, the Corba specification to be switched is compared with specifications in the specification mapping table; and when the Corba specification to be switched is included in the specification mapping table, the specification mapping table is parsed to obtain the configuration information of the Corba specification to be switched according to the corresponding relationship between the northbound Corba specification and the configuration information of the northbound Corba specification supported by the EMS.

Step S4: The EMS executes the seamless switching between northbound Corba interface specifications by using the configuration information required for the Corba specification to be switched.

In Step S4, the configuration information required for the Corba specification to be switched is associated with a POA by reading the configuration information required for the Corba specification to be switched so as to complete the seamless switching between northbound Corba interface specifications;

wherein the POA is a Portable Object Adapter.

Furthermore, before the configuration information required for the Corba specification to be switched is associated with the POA, the method further includes that: the POA is disassociated from configuration information required for an original Corba specification.

The method further includes that: when the northbound component of the EMS is started, the NMS uses the specification switching file provided by the EMS;

the specification switching file is parsed to obtain the resources required for Corba specification switching; and the Corba specification switching command is sent to the EMS according to the resources required for Corba specification switching.

Figure 2:
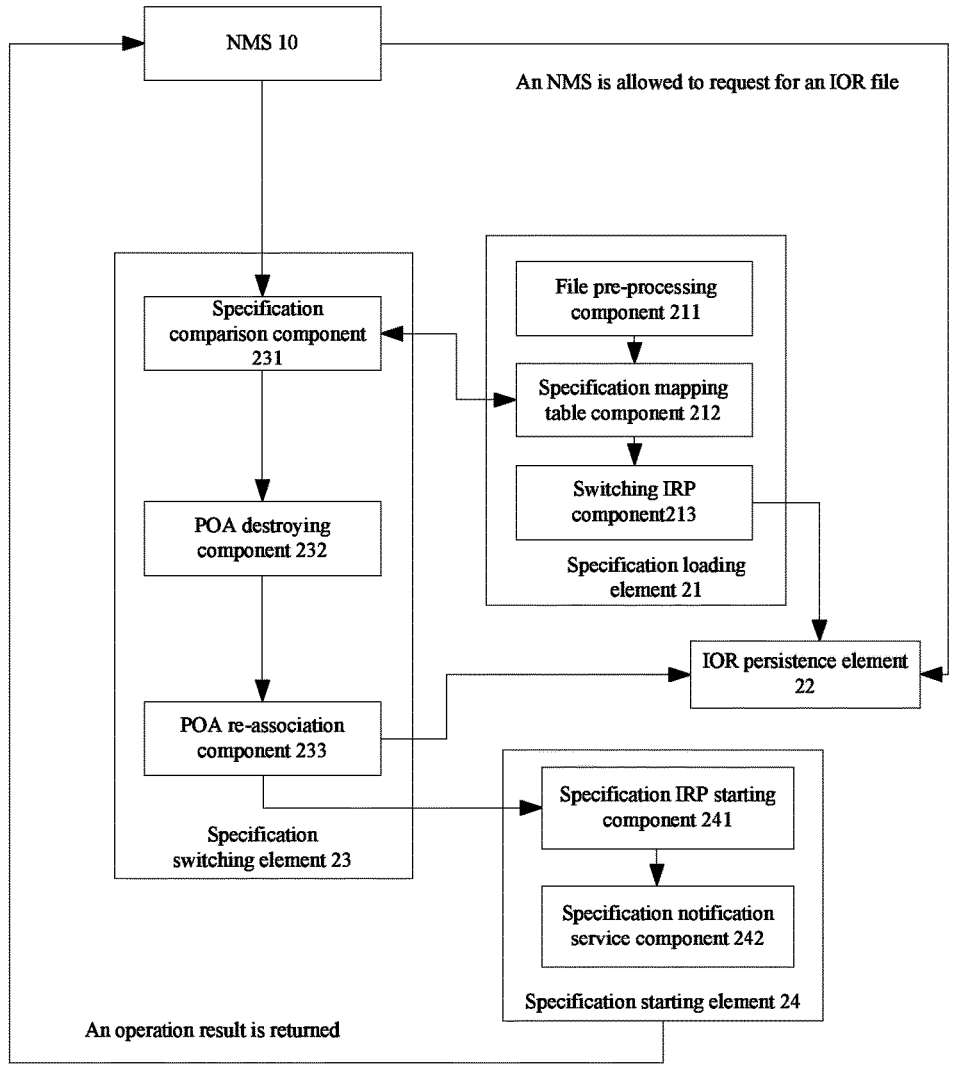
FIG. 2 is a structural diagram of a device for implementing seamless switching between northbound Corba interface specifications according to an embodiment of the disclosure.

FIG. 2 is a structural diagram of a device for implementing seamless switching between northbound Corba interface specifications according to an embodiment of the disclosure. As shown in FIG. 2, the device includes: a specification loading element 21, an IOR persistence element 22, a specification switching element 23 and a specification starting element 24, wherein the specification loading element 21 includes a file pre-processing component 211, a specification mapping table component 212 and a switching Integrated Reference Point (IRP) component 213. The specification switching element 23 includes a specification comparison component 231, a POA destroying component 232 and a POA re-association component 233. The specification starting element 24 includes a specification IRP starting component 241 and a specification notification service component 242.

The specification loading element 21 is configured to establish, when a northbound component of an EMS is started, according to configuration information of a northbound Corba specification supported by the EMS, a corresponding relationship between the northbound Corba specification and the configuration information of the northbound Corba specification supported by the EMS, and provide a specification switching file to an NMS, wherein the file pre-processing component 211 of the specification loading element 21 is configured to traverse and check configuration information which is pre-saved by the EMS and adaptive to the northbound Corba specification. The specification mapping table component 212 of the specification loading element 21 is configured to establish the corresponding relationship between the northbound Corba specification and the configuration information of the northbound Corba specification supported by the EMS according to the traversed and checked configuration information adaptive to the northbound Corba specification so as to generate a specification mapping table. The switching IRP component 213 of the specification loading element 21 is configured to initialize resources used for a northbound Corba specification switching operation, after the initialization is completed, the specification switching operation enters a standby state (a specific northbound Corba specification switching operation is not executed), an IOR file used for the NMS will be generated at the same time, and the NMS can send a specification switching operation command to the EMS by using the IOR file at this time.

The IOR persistence element 22 is configured to write generated IOR information required for the NMS to execute an IRP operation into the file.

The specification switching element 23 achieves a command parsing function, a specification parsing function and a POA association function, wherein the specification comparison component 231 of the specification switching element 23 achieves the command parsing function and the specification parsing function. Command parsing refers that according to a Corba specification switching command sent by the NMS on the basis of the specification switching file, the EMS obtains a Corba specification to be switched.

Specification parsing refers that according to the corresponding relationship between the northbound Corba specification and the configuration information of the northbound Corba specification supported by the EMS, the EMS acquires the configuration information required for the Corba specification to be switched. The POA destroying component 232 and the POA re-association component 233 achieve the POA association function, wherein POA association refers that the EMS executes the seamless switching between northbound Corba interface specifications by using the configuration information required for the Corba specification to be switched. The POA destroying component 232 is configured to disassociate the POA from configuration information required for an original Corba specification. The POA re-association component 233 is configured to re-associate resources with a northbound Corba specification to be set.

The specification starting element 24 is configured to start IRP service and notification service of the specification to be switched, and then return a northbound Corba specification switching result to the NMS. The specification IRP starting component 241 of the specification starting element 24 is configured to start the IRP service of a designated specification, after starting is completed, each management operation supported by the specification enters a standby state, an IOR file for the northbound Corba specification, used by the NMS, will be generated at the same time, and the NMS can send all management operations specified by the specification to the EMS by using the IOR file. The specification notification service component 242 of the specification starting element 24 is configured to start the notification service of a designated northbound Corba specification, after starting is completed, a notice can be sent to the NMS, and completion of a starting of the notification service means that the northbound Corba specification has been successfully started.

Figure 3:
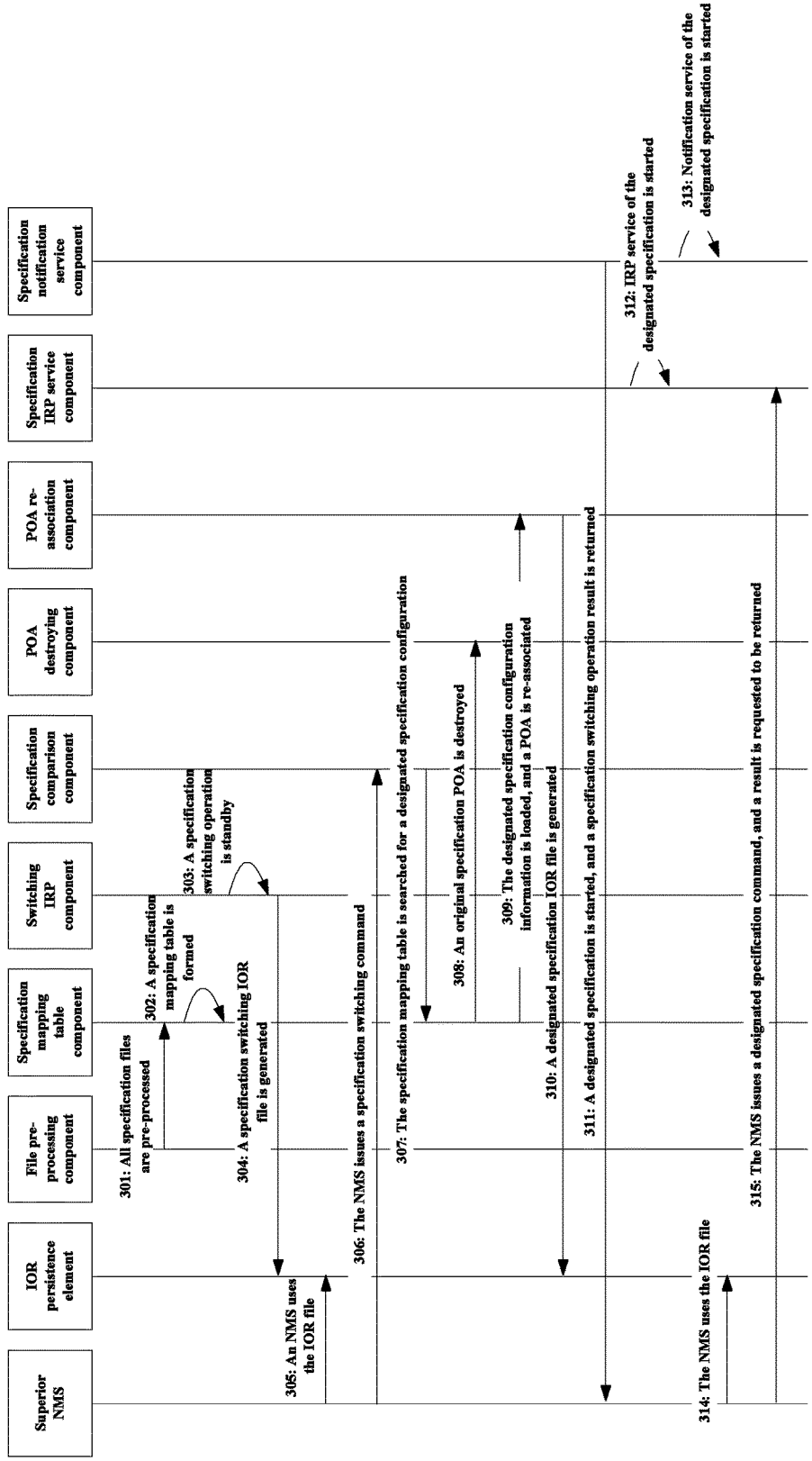
FIG. 3 is a flowchart of a method for implementing seamless switching between northbound Corba interface specifications according to an embodiment of the disclosure.

FIG. 3 is a flowchart of a method for implementing seamless switching between northbound Corba interface specifications according to an embodiment of the disclosure. As shown in FIG. 3, the method includes the specific steps as follows.

Step 301: When a northbound component of an EMS is started, configuration information of all northbound Corba interface specifications is pre-processed firstly.

Step 302: After a file pre-processing component completely executes operations, a specification mapping table will be formed.

Step 303: A specification switching IRP component loads resources required for specification switching, and then the EMS is under a specification switching operation standby state.

Step 304: After the specification switching IRP component completely loads the resources required for specification switching, an IOR persistence element is notified to write IOR information required for the NMS to issue a specification switching operation into a file.

Step 305: An NMS uses the IOR information (if the NMS is connected with the EMS in a manner of naming service, it is unnecessary to use the IOR information, a used naming service string being appointed by the two sides in advance).

Step 306: The NMS sends a specification switching command to the EMS.

Step 307: After the specification switching command is received by a specification comparison component, a name of a northbound Corba interface specification to be switched is sent to the specification mapping table to be searched.

Step 308: After the northbound Corba interface specification to be switched is found in the specification mapping table, a POA destroying component is notified to disassociate configuration information of an original northbound Corba interface specification from a POA.

Step 309: After the POA destroying component disassociates the configuration information of the original northbound Corba interface specification from the POA, the configuration information of the northbound Corba interface specification to be switched is re-associated with the POA, and the configuration information of the northbound Corba interface specification to be switched is read.

Step 310: A POA re-association component will notify an IOR persistence element to write IOR information of a new northbound Corba interface specification into the file.

Step 311: The EMS returns a specification switching operation result to the NMS.

Step 312: an IRP service of the new northbound Corba interface specification is started.

Step 313: a Notification service of the new northbound Corba interface specification is started.

Step 314: The NMS uses an IOR file of the new northbound Corba interface specification (if the NMS is connected with the EMS in a manner of naming service, it is unnecessary to use the IOR file, a used naming service string being appointed by the two sides in advance under this situation).

Step 315: The NMS can send all management operation instructions of the new northbound Corba interface specification, and the EMS returns a management operation result.

The embodiments of the disclosure are described by taking a Java programming language as an example.

An IDL file is compiled, and a switching-related command and the number and type of parameters of the command are defined in the file. For example, the type of Corba specifications supported by the EMS is queried, a Corba specification used by the EMS currently is queried, the Corba specification of the EMS is switched to a designated specification, and previous specification switching time, a previous specification switching route and the like are queried, wherein, the most important operation command refers to switching the Corba specification of the EMS to the designated specification. In addition, as needed, a naming service string can be appointed in the file.

A file in an Extensive Markup Language (XML) format is pre-set for the EMS, and the names of all types of northbound Corba interface specifications supported by the EMS and a path of a configuration file corresponding to each specification are recorded in the file. After being started, the northbound component reads the XML file, sequentially reads the names of the northbound Corba specifications and the path information of the configuration file corresponding to each specification, scans a storage medium in accordance with the path information of the configuration file, and checks whether the corresponding configuration file exists and whether the file format is correct. If the corresponding configuration file exists and the file format is correct, the paths of all corresponding configuration files under the specification are combined into a List (linked list—Java term), the name of the specification serves as a key name, the List combined by the file paths corresponding to the specification serves as a key value, and the key name and the key value are saved in a HashMap (hash table—Java term). After the XML file is completely processed, a HashMap is obtained, and the HashMap contains all types of northbound Corba interface specifications and the corresponding configuration information.

A Class (class—java term, an implementation mode being seen below) in charge of implementing a northbound Corba specification switching-related operation is instantiated to obtain a Servant (servant—term of a Corba protocol in Java implementation), and the Servant is activated. An association between a POA and the servant is created, the POA is bound with a naming service string appointed by the servant, and at this time, northbound Corba interface specification switching service has been running in a ready state. Then, an IOR character string obtained by converting the Servant is written into the storage medium to obtain an IOR file.

The NMS sends a northbound Corba interface specification switching command to the EMS in two modes. The first mode refers to that the EMS obtains the generated specification switching IOR file and parses the file so as to connect to the corresponding POA on the EMS. The second mode refers to that the file is parsed by means of the pre-appointed naming service string so as to connect to the corresponding POA on the EMS. After a target resource is obtained, the POA can send an operation instruction to target resource. This part is a conventional implementation flow of the NMS, which will not be introduced in detail.

Figure 4:
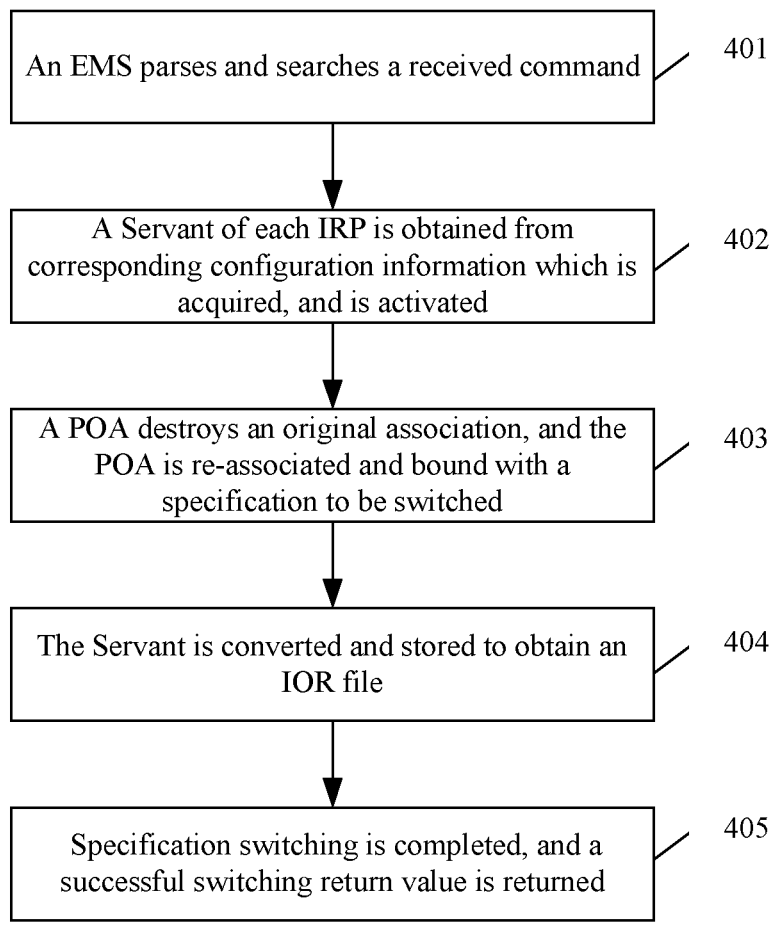
FIG. 4 is a flowchart of implementation of a switching-related operation by a Class of an EMS for implementing seamless switching between northbound Corba interface specifications according to an embodiment of the disclosure.

FIG. 4 is a flowchart of implementation of a switching-related operation by a Class of an EMS for implementing seamless switching between northbound Corba interface specifications according to an embodiment of the disclosure. As shown in FIG. 4, a method about command receiving, specification parsing, specification switching and the like in a Class of an EMS in charge of implementing a northbound Corba specification switching-related operation includes the specific implementation steps as follows.

Step S401: After receiving a specification switching command sent by an NMS, the EMS parses a type of the command and parameters of the command to obtain a name of a northbound Corba specification to be switched, and checks whether a key name is the name of the specification to be switched in a HashMap.

Step S402: If so, a corresponding key value, namely a series of configuration files corresponding to the specification to be switched, is acquired by means of the key name. A class path of each IRP implementation class of the specification to be switched is acquired from the series of configuration files so as to instantiate each IRP implementation class to obtain a Servant of each IRP and activate the Servant.

Step S403: A POA of each IRP of an original specification is emptied and destroyed, a re-association between the POA and the Servant of each IRP of the specification to be switched is created, and the created POA is bound with an appointed naming service string.

Step S404: An IOR character string obtained by converting the Servant of each IRP of the specification to be switched is written into a storage medium so as to obtain an IOR file of the specification to be switched.

Step S405: Switching between northbound Corba interfaces is completed, and after the specification switching operation is completed, a successful switching return value is returned.

Thereafter, the EMS loads other pieces of configuration information of each IRP of the specification to be switched and starts corresponding basic service in a conventional mode, and then starts the notification service of the specification to be switched. After starting of these two parts is completed, the NMS can be connected to the EMS in a mode of acquiring the IOR file of the Corba interface specification to be switched or in a mode of naming service, and then sends a management command about the specification to be switched to the EMS.

The embodiments of the disclosure also provide a computer storage medium, wherein computer executable instructions are stored in the computer storage medium and are used for executing the above method.

To sum up, the embodiments of the disclosure have the technical effects as follows. By implementing a method for a specification switching interface consistent with a Corba interface on the EMS, the NMS initiates a specification switching operation, and the EMS automatic completes specification switching without needing to cooperate with a person and without needing to be stopped, so that the operation efficiency and the usability are improved, thereby ensuring the service continuity.

All elements can be implemented by a Central Processing Element (CPU), a Digital Signal Processor (DSP) or a Field-Programmable Gate Array (FPGA) in an electronic device.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be implemented by computer program instructions. These computer program instructions can be provided for a general computer, a dedicated computer, an embedded processor or processors of other programmable data processing devices to generate a machine, so that a device for achieving functions designated in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction device is generated via the instructions stored in the computer readable memory, and the instruction device achieves the functions designated in one or more flows of the flowcharts and/or one or more blocks of the block diagrams.

These computer program instructions can also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

Although the disclosure is described above in detail, the disclosure is not limited thereto, and those skilled in the art can make modifications according to the principle of the disclosure. Thus, the modifications made according to the principle of the disclosure should be interpreted as falling within the protection scope of the disclosure.

What is claimed is:

1. A method for implementing seamless switching between northbound Common Object Request Broker Architecture (Corba) interface specifications, comprising:
   establishing, when a northbound component of an Element Management System (EMS) is started, according to configuration information of a northbound Corba specification supported by the EMS, a corresponding relationship between the northbound Corba specification supported by the EMS and the configuration information of the northbound Corba specification supported by the EMS, and providing a specification switching file to a Network Management System (NMS);
   obtaining, by the EMS, according to a Corba specification switching command sent by the NMS on a basis of the specification switching file, a northbound Corba specification to be switched;
   acquiring, by the EMS, according to the corresponding relationship between the northbound Corba specification supported by the EMS and the configuration information of the northbound Corba specification supported by the EMS, configuration information required for the northbound Corba specification to be switched; and
   executing, by the EMS, seamless switching between the northbound Corba interface specifications by using the configuration information required for the northbound Corba specification to be switched;
   wherein executing seamless switching between the northbound Corba interface specifications by using the configuration information required for the northbound Corba specification to be switched comprises:
   associating the configuration information required for the northbound Corba specification to be switched with a Portable Object Adapter (POA) by reading the configuration information required for the northbound Corba specification to be switched, to complete the seamless switching between the northbound Corba interface specifications;
   wherein before the configuration information required for the northbound Corba specification to be switched is associated with the POA, the method further comprises: disassociating the POA from configuration information required for an original Corba specification.

2. The method as claimed in claim 1, wherein the establishing, according to the configuration information of the northbound Corba specification supported by the EMS, the corresponding relationship between the northbound Corba specification supported by the EMS and the configuration information of the northbound Corba specification supported by the EMS comprises:
   traversing and checking the configuration information which is pre-saved by the EMS and adaptive to the northbound Corba specification; and
   establishing the corresponding relationship between the northbound Corba specification and the configuration information according to the traversed and checked configuration information adaptive to the northbound Corba specification to generate a specification mapping table.

3. The method as claimed in claim 1, wherein providing the specification switching file to the NMS comprises:
   loading resources required for Corba specification switching; and
   generating an Interoperable Object Reference (IOR) file containing the loaded resources required for the Corba specification switching, according to the loaded required resources, for the NMS to use.

4. The method as claimed in claim 1, wherein sending, by the NMS, the Corba specification switching command according to the specification switching file comprises:
   acquiring, by the NMS, an IOR file from the EMS;
   parsing the acquired IOR file to obtain resources required for Corba specification switching; and
   sending the Corba specification switching command to the EMS according to the obtained resources required for Corba specification switching.

5. The method as claimed in claim 1, wherein acquiring, according to the corresponding relationship between the northbound Corba specification supported by the EMS and the configuration information of the northbound Corba specification supported by the EMS, the configuration information required for the northbound Corba specification to be switched comprises:
   comparing the northbound Corba specification to be switched with specifications in a specification mapping table; and
   when the northbound Corba specification to be switched is included in the specification mapping table, parsing, according to the corresponding relationship between the northbound Corba specification supported by the EMS and the configuration information of the northbound Corba specification supported by the EMS, the specification mapping table to obtain the configuration information required for the northbound Corba specification to be switched.

6. The method as claimed in claim 1, further comprising:
   when the northbound component of the EMS is started, acquiring, by the NMS, the specification switching file provided by the EMS;
   parsing the specification switching file to obtain resources required for Corba specification switching; and
   sending a Corba specification switching command to the EMS according to the resources required for Corba specification switching.

7. A device for implementing seamless switching between northbound Common Object Request Broker Architecture (Corba) interface specifications, comprising:
   a processor coupled to a memory, the processor including a specification loading element, a command parsing element, a specification parsing element, and a Portable Object Adapter (POA) association element;
   wherein the processor is configured to establish, with the specification loading element, when a northbound component of an Element Management System (EMS) is started, according to configuration information of a northbound Corba specification supported by the EMS, a corresponding relationship between the northbound Corba specification supported by the EMS and the configuration information of the northbound Corba specification supported by the EMS, and provide a specification switching file to a Network Management System (NMS);
   wherein the processor is configured to obtain, with the command parsing element, according to a Corba specification switching command sent by the NMS on a basis of the specification switching file, a northbound Corba specification to be switched;

wherein the processor is configured to acquire, with the specification parsing element, according to the corresponding relationship between the northbound Corba specification and the configuration information of the northbound Corba specification supported by the EMS, the configuration information required for the northbound Corba specification to be switched;

wherein the processor is configured to execute, with the Portable Object Adapter (POA) association element, seamless switching between northbound Corba interface specifications by using the configuration information required for the northbound Corba specification to be switched;

wherein the processor is further configured to associate, with the POA association element, the configuration information required for the northbound Corba specification to be switched with a POA by reading the configuration information required for the northbound Corba specification to be switched, to complete the seamless switching between the northbound Corba interface specifications; and wherein before the configuration information required for the northbound Corba specification to be switched is associated with the POA, the processor is further configured, with the POA association element, to disassociate the POA from configuration information required for an original Corba specification.

8. The device as claimed in claim 7, wherein the specification loading element comprises:

a file pre-processing component, configured to traverse and check configuration information which is pre-saved by the EMS and adaptive to the northbound Corba specification; and a specification mapping table component, configured to establish the corresponding relationship between the northbound Corba specification and the configuration information of the northbound Corba specification supported by the EMS according to the traversed and checked configuration information adaptive to the northbound Corba specification to generate a specification mapping table.

9. A non-transitory computer storage medium, wherein the computer storage medium stores computer executable instructions, which are used for executing the method as claimed in claim 1.

10. A non-transitory computer storage medium, wherein the computer storage medium stores computer executable instructions, which are used for executing the method as claimed in claim 2.

11. A non-transitory computer storage medium, wherein the computer storage medium stores computer executable instructions, which are used for executing the method as claimed in claim 3.

12. A non-transitory computer storage medium, wherein the computer storage medium stores computer executable instructions, which are used for executing the method as claimed in claim 4.

13. A non-transitory computer storage medium, wherein the computer storage medium stores computer executable instructions, which are used for executing the method as claimed in claim 5.

14. A non-transitory computer storage medium, wherein the computer storage medium stores computer executable instructions, which are used for executing the method as claimed in claim 6.

* * * * *